(12) United States Patent
Bangert et al.

(10) Patent No.: US 6,643,570 B2
(45) Date of Patent: Nov. 4, 2003

(54) AIRCRAFT ENGINE RELIABILITY BUSINESS MODEL

(76) Inventors: Barry Bangert, P.O. Box 1059, Minden, NV (US) 89423; Ralph Hawkins, 150 High St., Canton, MA (US) 02021-3611

( * ) Notice: Subject to any disclaimer, the term of this patent is extended or adjusted under 35 U.S.C. 154(b) by 0 days.

(21) Appl. No.: 10/346,844

(22) Filed: Jan. 15, 2003

(65) Prior Publication Data

US 2003/0135310 A1 Jul. 17, 2003

Related U.S. Application Data

(62) Division of application No. 09/603,760, filed on Jun. 22, 2000, now abandoned.

(51) Int. Cl.[7] ................................................. G06F 7/00
(52) U.S. Cl. .............................. 701/29; 701/3; 244/75 R
(58) Field of Search ................................. 701/3, 29, 30, 701/34, 112; 244/75 R; 60/734, 796

(56) References Cited

U.S. PATENT DOCUMENTS 3,582,928 A * 6/1971 Gaertner
5,581,464 A * 12/1996 Woll et al.
5,663,642 A * 9/1997 Rumberger et al.
6,189,313 B1 * 2/2001 Cass et al. .................. 60/39.31

* cited by examiner

*Primary Examiner*—Gertrude Arthur
(74) *Attorney, Agent, or Firm*—Herbert C. Schulze

(57) ABSTRACT

A business model algorithm for maintaining aircraft engines in reliable and safe operating condition without the necessity of performing major engine overhaul in which engine manufacturers' maintenance procedures are enhanced and performed more frequently and supplemented by engine trend analysis, engine oil analysis, engine vibration analysis, borescope inspection and computer algorithm forecasting to identify, repair, and/or replace engine components without necessity of major engine overhaul.

1 Claim, 2 Drawing Sheets

AIRCRAFT ENGINE RELIABILITY BUSINESS MODEL

CROSS REFERENCE TO RELATED PATENT APPLICATIONS

This application is related to and is a division of our application Ser. No. 09/603,760 filed Jun. 22, 2000 Aircraft Engine Reliability Business Model, now abandonned.

BACKGROUND OF THE INVENTION

1. Field of the Invention

This invention is in the general field of the establishment of a business model/algorithm related to the economical maintenance of aircraft engine reliability and safety;

The invention is now the culmination of the standardization of maintenance procedures and the establishment of a step by step procedure (an algorithm) and a computerized program for adapting a continuing maintenance procedure to the changing condition and aging of components of aircraft engines and the constant upgrading and/or replacement of components in lieu of major engine overhaul, and thus is in the field of economical aircraft engine business models and algorithms.

2. Description of the Prior Art

The prior art is generally well known and includes all of the prior art cited and referred to in the file of our previously referenced co-pending application for patent. The prior art includes, importantly, our prior developments leading to the present complete business model algorithm. The prior art of importance includes all engine manufacturers' maintenance manuals, our own FAA certifications, Aircraft Power Plants by Bent/McKinley, Rolls Royce—the Jet Engine, and U.S. Pat. Nos. 5,663,642 and 3,582,928.

None of this prior art anticipates nor suggests our present invention which includes all of the steps and elements which now constitute our complete business model and programmed algorithm.

SUMMARY OF THE INVENTION

Aircraft engines must constantly be maintained in optimum operating condition. Unlike automotive engines and the like, failure of an aircraft engine during operation leads to a crash with devastating results and loss of life. For this reason, in the past it has been customary to follow maintenance procedures as specified by the various engine manufacturers including regularly scheduled major engine overhauls.

A major engine overhaul requires that the entire aircraft be out of service for a considerable time. Additionally, in performing a major overhaul damage can be done to the engine due to the fact that many engine components are assembled with what is referred to as an "interference fit" (where a slightly larger outside diameter part is placed within a slightly smaller inside diameter part). This is known to those skilled in the art and is accomplished during assembly by heating (expanding) the part with the smaller diameter and chilling (contracting) the part with the larger diameter. During disassembly great amounts of force must be applied to separate such parts, which can result in damage. The lost time for the aircraft itself, for the engine, and the costly overhaul procedure become a major economic item in the calculation of the total cost of aircraft operation.

We have previously improved on this process with our co-pending application for patent referred to above. With our present business method and computer assisted algorithm, we have now achieved a great breakthrough in the cost and reliability of aircraft engine maintenance.

In performing our maintenance methods, we do a complete step by step method in which we effectively maintain, repair, and replace parts which are anticipated to be possible trouble elements before any actual breakdown or serious difficulty occurs. Our business model algorithm includes a computer assisted forecast of components which should receive attention prior to an actual difficulty occurring.

We accomplish this by a combination of all we have learned over a lengthy period of development, which has now recently culminated in the most superior system for insuring the safety and reliability of aircraft engines with the assistance of computer assisted forecasting of engine maintenance requirements.

Basically our new method involves the following distinct, cooperative steps:

Step 1: Perform the normal maintenance procedures specified by the engine manufacturer more frequently than specified by the manufacturer (every manufacturer specifies procedures in a manual which accompanies the engine);

Step 2: Perform spectrometric engine oil analysis;

Step 3: Analysis of debris (wear material) from the engine oil;

Step 4: Perform engine performance trend monitoring;

Step 5: Perform engine vibration analyses and dampen vibration;

Step 6: Perform borescope inspection;

Step 7: Computer analysis and forecasting from results of the above steps;

Step 8: Repair or replace components as indicated by the results of each of the foregoing steps.

It is an object of this invention to eliminate the necessity of major aircraft engine overhaul;

Another object of this invention is to maximize the useful flying time for aircraft and aircraft engines;

Another object of this invention is to maintain aircraft engines in a state of maximum reliability;

Another object of this invention is to identify and correct aircraft engine problems before they occur.

The foregoing and other objects and advantages of this invention will become apparent to those skilled in the art upon reading the description of a preferred embodiment, which follows, in conjunction with a review of the appended drawings.

DESCRIPTION OF A PREFERRED EMBODIMENT

Figure 1:
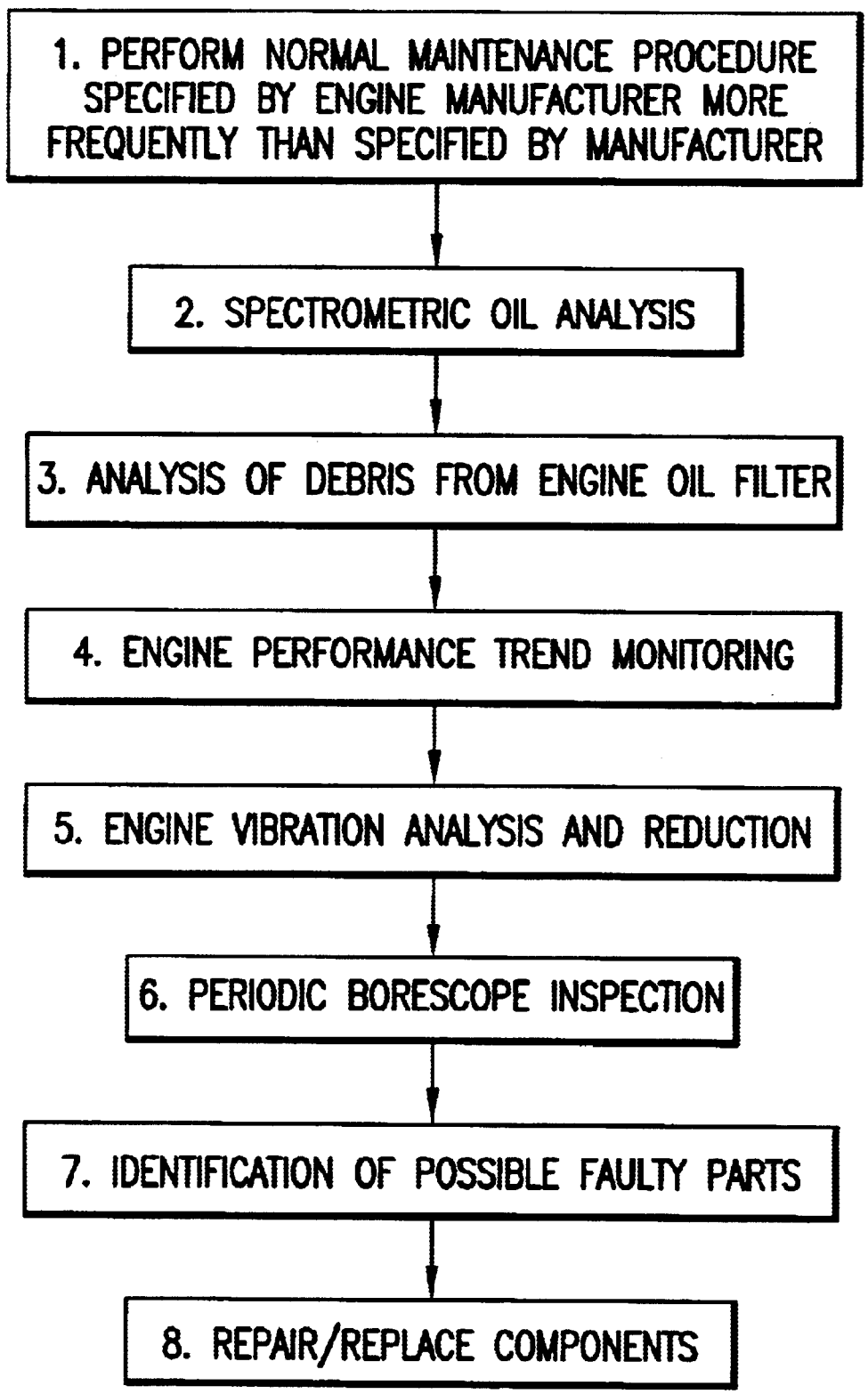
FIG. 1 is a block diagram showing the steps performed in our new aircraft engine maintenance model.

There are no drawings other than the two block diagrams. In our previously referred to co-pending patent application we found it necessary to go into some detail of the mechanical activities and elements needed. However, we have found that we can completely describe our now highly refined business model algorithm and computerized predicting system in simple terms which anyone skilled in the art should easily understand.

The simplicity of what we have now accomplished is one of the greatest virtues of this new, practically self executing, aircraft engine maintenance algorithm. It is now possible for relatively inexperienced workers to follow a straight forward plan with virtually no danger of mistake.

Step 1: The first step in this maintenance method is merely following the exact procedures recommended by the engine manufacturer. The procedures are spelled out in the manual which accompanies the engine. The manual will generally list all cleaning materials, testing equipment, and the like needed to perform the manufacturer's recommenced maintenance. We insist on full compliance with the manufacturer's recommended procedures as the first step. However, in our procedure we increase the frequency of the manufacturers' recommended procedures. This part does not constitute a mandatory part of our method, and in some instances, depending upon the record of performance of the engine in question, it will be possible to merely follow the manufacturers' schedule with out increase of frequency at this stage.

Each of the following steps will be performed along with the manufacturers' specified maintenance procedures.

Step 2 in our procedure is a very important procedure. Fortunately, however, it is simple from the standpoint of maintenance personnel. This is the performance of a spectrometric oil analysis. The maintenance personnel need only deliver the oil from the engine to a laboratory for this test. In this test, the oil is analyzed in order to identify the chemical elements indicating the wear metals such as iron, nickel, chromium, etc.

Step 3 is closely allied with step two. In step three we actually collect debris and remove debris from the engine oil. This is a simple process of screening the debris. The debris must then be analyzed chemically or by electron microscope energy dispersive analysis. This will be performed in a laboratory. The maintenance personnel is only responsible for the collection of the material. The combination of the results of steps two and three reveal which components, if any, are wearing excessively (the relative amounts of various metals can lead directly to any parts which may be due for repair or replacement, since the metallic composition of the parts is known.

Step 4 in this step by step procedure is performance of engine trend monitoring. In this step, the engine performance is compared to the same engine's earlier performance. Any changes in the engine's performance compared to earlier performance can be evaluated by one skilled in the art to determine if any changes in the performance are a forewarning of potential problems which can be immediately isolated and analyzed.

Step 5 is an engine vibration analysis. At this stage the engine's vibration is compared to that of a known reliable engine having a proper vibration level. Those skilled in the art can take steps to dampen unusual vibration. If such steps are unsuccessful, the engine can be further examined and adjusted until the vibration level is acceptable.

Step 6 is a borescope inspection. Those skilled in the art are familiar with this. Cracks and the like can be detected during this procedure and corrective maintenance performed based upon the borescope findings.

Step 7 is a computer analysis and projection of the condition of the engine at any future time. This is based upon time sensitive formulas predicting, based upon all past inspections of the engine. A possible future failure of a component is predicted.

Step 8 is the actual repair or replacement of components which have become suspect by reason of all of the foregoing mentioned procedures.

Next, is the entry of all of the information of the tests and the like performed and information on repairs or replacements into a computer for coordination, comparison, and forecast.

There is a definite redundancy in our procedure as set forth. This is purposeful. It would be possible, and other maintenance procedures do so, to eliminate some of the overlapping procedures. But, it is this very redundancy which makes it possible for those using our system to avoid the major engine overhaul which others find necessary.

Figure 2:
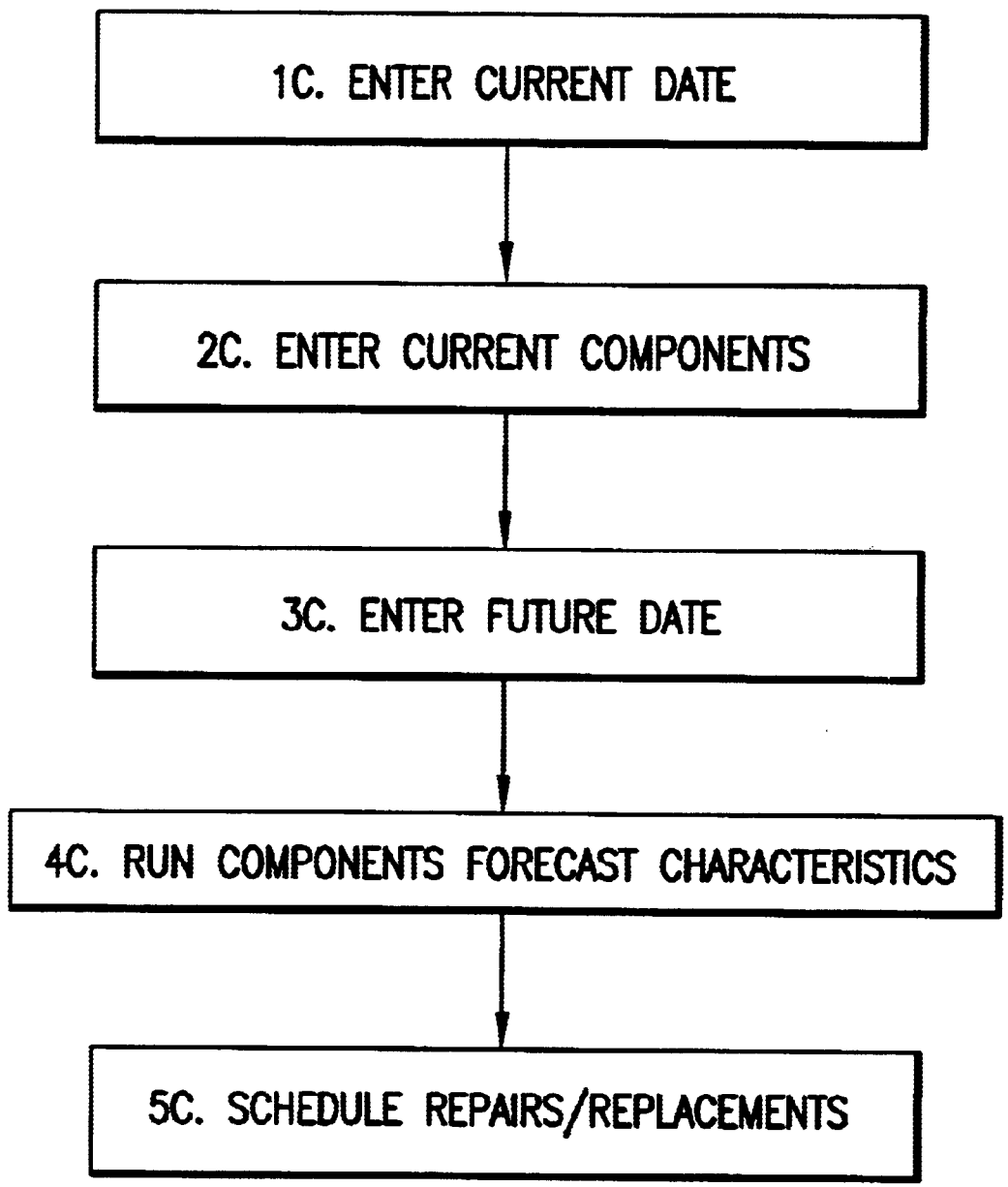
FIG. 2 is a block diagram of the computer operations for predicting repair or replacement schedules.

FIG. 2 is a block diagram of the steps involved in a computer controlled anticipatory schedule for each engine at each inspection schedule. By following this forecast of the condition to be expected at the next inspection, proper supply of parts and materials which may be needed can, in this manner, be properly planned.

Step 1C involves the simple entry of the current date. Customarily, this will be automatically entered by the computer's own calendar. This will be known to those skilled in the art. This date information is entered into a software program, which can be an existing forecasting program such as Microsoft Project or the like, which can be individually programmed for individual engines as is known to those skilled in the art. Also, A special program can be written for this as will be understood by those skilled in the art.

Step 2C is the entry of each component's characteristics as determined from the various tests, adjustments, repairs, and replacements as performed in the just concluded scheduled maintenance. This data will be entered into the program as will be understood by those skilled in the art.

Step 3C is the entry of the projected date in the future when the next maintenance will be performed.

Step 4C is the running of the forecast program by the computer.

Step 5C consists of a print out of the schedule of anticipated repairs/replacements and the material, tools, etc. required to be available at the time of the scheduled maintenance activity.

In the event that we should fail to claim any patentable feature of this invention, such failure to claim will be the result of inadvertence or oversight, and not due to any intent to abandon or dedicate such feature. In the event such a situation comes to our attention, we shall immediately seek to claim such feature by re-issue or other appropriate procedure.

While the embodiments of this invention specifically described herein are fully capable of achieving the objects and advantages desired, it is to be understood that such embodiments are for purposes of illustration only and not for purposes of limitation.

We claim:

1. A business model algorithm for maintenance of an aircraft engine so as to insure the reliability of the engine without performing a major engine overhaul comprising:

performing the engine manufacturer's recommended maintenance more frequently than that set forth in the manufacturer's engine manual; b) performing the following procedures along with the manufacturers' recommended procedures—spectrometric engine oil analysis and engine oil debris analysis; monitoring the engine trend; analyzing engine vibration and dampening vibration to meet the standard set by a known properly operating engine; making borescope inspections;—c) identifying defective or failing components based on all of the foregoing; and d) repairing or replacing components found to be defective or failing.

* * * * *